US008661530B2

(12) United States Patent
Griffin et al.

(10) Patent No.: US 8,661,530 B2
(45) Date of Patent: *Feb. 25, 2014

(54) MULTI-LAYER ORIENTATION-CHANGING PASSWORD

(75) Inventors: Jason Tyler Griffin, Waterloo (CA); Steven Henry Fyke, Waterloo (CA); Jerome Pasquero, Waterloo (CA); Neil Patrick Adams, Waterloo (CA); Michael Kenneth Brown, Waterloo (CA)

(73) Assignee: BlackBerry Limited, Waterloo (CA)

( * ) Notice: Subject to any disclaimer, the term of this patent is extended or adjusted under 35 U.S.C. 154(b) by 30 days.

This patent is subject to a terminal disclaimer.

(21) Appl. No.: 12/969,645

(22) Filed: Dec. 16, 2010

(65) Prior Publication Data

US 2012/0159593 A1   Jun. 21, 2012

(51) Int. Cl.
*G06F 21/00* (2013.01)
(52) U.S. Cl.
USPC .................... 726/19; 726/2; 726/27; 713/168
(58) Field of Classification Search
None
See application file for complete search history.

(56) References Cited

U.S. PATENT DOCUMENTS

| | | | |
|---|---|---|---|
| 5,821,933 A * | 10/1998 | Keller et al. | 715/741 |
| 6,209,104 B1 | 3/2001 | Jalili | |
| 6,686,931 B1 | 2/2004 | Bodnar | |
| 6,950,949 B1 | 9/2005 | Gilchrist | |
| 7,376,899 B2 | 5/2008 | Mantyla | |
| 7,453,443 B2 | 11/2008 | Rytivaara et al. | |
| 7,659,869 B1 | 2/2010 | Bauchot et al. | |
| 7,720,307 B2 | 5/2010 | Iizuka | |
| RE41,922 E | 11/2010 | Gough et al. | |
| 8,229,250 B2 | 7/2012 | Suzuki et al. | |
| 2002/0029341 A1 | 3/2002 | Juels et al. | |
| 2003/0193512 A1 | 10/2003 | Komagata | |
| 2004/0010721 A1 | 1/2004 | Kirovski et al. | |
| 2004/0010722 A1 | 1/2004 | Ha | |
| 2004/0030933 A1 | 2/2004 | Park | |

(Continued)

FOREIGN PATENT DOCUMENTS

| | | |
|---|---|---|
| EP | 0677801 | 10/1995 |
| EP | 0901060 A2 | 3/1999 |

(Continued)

OTHER PUBLICATIONS

European Search Report from European Patent Application No. EP 10195339 completed Mar. 9, 2011; mailed on Mar. 16, 2011.

(Continued)

*Primary Examiner* — Jeffrey Pwu
*Assistant Examiner* — Helai Salehi
(74) *Attorney, Agent, or Firm* — Ridout & Maybee LLP

(57) ABSTRACT

A method of authenticating a user of a computing device is proposed, together with computing device on which the method is implemented. In the method a modified base image is overlaid with a modified overlay image on a display and at least one of the modified base image and modified overlay image is moved by the user. In addition to the moving, a change in orientation of at least one of the modified base image and the modified overlay image is required. Positive authentication is indicated in response to the base image reference point on the modified base image being aligned with the overlay image reference point on the modified overlay image and the change in orientation matching a preselected orientation criterion.

21 Claims, 10 Drawing Sheets

(56) References Cited

U.S. PATENT DOCUMENTS

| | | |
|---|---|---|
| 2005/0201638 A1 | 9/2005 | Cha |
| 2005/0251752 A1 | 11/2005 | Tan et al. |
| 2006/0206717 A1 | 9/2006 | Holt et al. |
| 2006/0206919 A1 | 9/2006 | Montgomery et al. |
| 2006/0238517 A1 | 10/2006 | King et al. |
| 2007/0150842 A1 | 6/2007 | Chaudhri et al. |
| 2007/0250934 A1 | 10/2007 | Park |
| 2007/0277224 A1 | 11/2007 | Osborn et al. |
| 2008/0060052 A1 | 3/2008 | Hwang et al. |
| 2008/0092245 A1 | 4/2008 | Alward et al. |
| 2008/0113791 A1 | 5/2008 | Williams et al. |
| 2008/0127302 A1 | 5/2008 | Qvarfordt et al. |
| 2008/0201578 A1 | 8/2008 | Drake |
| 2008/0209223 A1 | 8/2008 | Nandy et al. |
| 2008/0244700 A1 | 10/2008 | Osborn et al. |
| 2009/0012880 A1 | 1/2009 | Tortola |
| 2009/0037986 A1 | 2/2009 | Baker |
| 2009/0038006 A1 | 2/2009 | Traenkenschuh et al. |
| 2009/0046856 A1 | 2/2009 | Mitchell |
| 2009/0046929 A1 | 2/2009 | De Leon |
| 2009/0077653 A1 | 3/2009 | Osborn et al. |
| 2009/0138723 A1 | 5/2009 | Nyang et al. |
| 2009/0160800 A1 | 6/2009 | Liu et al. |
| 2009/0187986 A1 | 7/2009 | Ozeki |
| 2009/0293119 A1 | 11/2009 | Jonsson |
| 2009/0300732 A1 | 12/2009 | Hwang et al. |
| 2009/0313693 A1 | 12/2009 | Rogers |
| 2009/0328175 A1 | 12/2009 | Shuster |
| 2010/0037313 A1* | 2/2010 | Tomeny .................... 726/19 |
| 2010/0040293 A1 | 2/2010 | Hermann et al. |
| 2010/0043062 A1 | 2/2010 | Alexander et al. |
| 2010/0064376 A1 | 3/2010 | Vladimirovitch et al. |
| 2010/0107067 A1 | 4/2010 | Vaisanen |
| 2010/0169958 A1 | 7/2010 | Werner et al. |
| 2010/0180336 A1 | 7/2010 | Jones et al. |
| 2010/0205667 A1 | 8/2010 | Anderson et al. |
| 2010/0287382 A1 | 11/2010 | Gyorffy et al. |
| 2010/0322485 A1 | 12/2010 | Riddiford |
| 2010/0333198 A1 | 12/2010 | Mikake |
| 2011/0096997 A1 | 4/2011 | Marciszko et al. |
| 2011/0202982 A1 | 8/2011 | Alexander et al. |
| 2011/0289576 A1 | 11/2011 | Cheng |
| 2012/0011564 A1 | 1/2012 | Osborn et al. |
| 2012/0023574 A1 | 1/2012 | Osborn et al. |
| 2012/0167199 A1 | 6/2012 | Riddiford |
| 2012/0291120 A1 | 11/2012 | Griffin |

FOREIGN PATENT DOCUMENTS

| | | | |
|---|---|---|---|
| EP | 1422589 | A1 | 5/2004 |
| EP | 1845474 | A1 | 10/2007 |
| EP | 2000939 | A2 | 12/2008 |
| EP | 2254071 | | 11/2010 |
| EP | 2254071 | A1 | 11/2010 |
| JP | 2001092785 | A | 4/2001 |
| TW | I268690 | | 12/2006 |
| WO | 0198924 | A1 | 12/2001 |
| WO | 0199338 | A1 | 12/2001 |
| WO | 03048909 | A2 | 6/2003 |
| WO | 2004027632 | A1 | 4/2004 |
| WO | 2005029216 | A2 | 3/2005 |
| WO | 2006073313 | A1 | 7/2006 |
| WO | 2007098569 | A1 | 9/2007 |
| WO | 2008124708 | A2 | 10/2008 |
| WO | 2008132724 | A1 | 11/2008 |
| WO | 2009022242 | | 2/2009 |
| WO | 2009150655 | A1 | 12/2009 |

OTHER PUBLICATIONS

European Search Report from European Patent Application No. EP 10195336 completed Mar. 4, 2011; mailed on Mar. 14, 2011.
European Search Report from European Patent Application No. EP 10195333 completed Apr. 29, 2011; mailed on May 11, 2011.
European Search Report from European Patent Application No. EP 10195351 completed Mar. 17, 2011; mailed on Mar. 25, 2011.
European Search Report from European Patent Application No. EP 10195338 completed Apr. 29, 2011; mailed on May 11, 2011.
European Search Report from European Patent Application No. EP 10195350 completed Mar. 31, 2011; mailed on Apr. 7, 2011.
European Search Report from European Patent Application No. EP 10195349 completed Mar. 14, 2011; mailed on Mar. 22, 2011.
European Search Report from European Patent Application No. EP 10195342 completed Apr. 7, 2011; mailed on Apr. 14, 2011.
European Search Report from European Patent Application No. EP 10195344 completed Apr. 28, 2011; mailed on May 10, 2011.
European Search Report from European Patent Application No. EP 10195347 completed Apr. 27, 2011; mailed on May 10, 2011.
Kim, David et al.; "Multi-Touch Authentication on Tabletops"; http://homepages.cs.ncl.ac.uk/david.kim/multi-touch_authentication; online; printed Mar. 10, 2011; 6 pages.
Hoanca et al.; Screen oriented technique for reducing the incidence of shoulder surfing; Proceedings of International Conference of Security of Information and Networks. 2005—Citeseer; pp. 1-7.
Office Action from U.S. Appl. No. 12/969,647 issued on Nov. 20, 2012; 11 pages.
Office Action from U.S. Appl. No. 12/969,646 issued on Oct. 3, 2012; 16 pages.
Office Action from U.S. Appl. No. 12/969,797 issued on Oct. 10, 2012; 17 pages.
Office Action from U.S. Appl. No. 12/815,763 issued on Oct. 11, 2012; 15 pages.
Office Action from U.S. Appl. No. 12/969,640 issued on Aug. 14, 2012; 18 pages.
Notice of Allowance from U.S. Appl. No. 12/969,638 issued on Nov. 9, 2012; 15 pages.
Office Action from U.S. Appl. No. 12/969,633 issued on Aug. 27, 2012; 17 pages.
Office Action from Great Britain Application No. GB0912008.0 issued on Feb. 2, 2012; 7 pages.
Office Action from Great Britain Application No. GB0912008.0 issued on Aug. 2, 2012; 7 pages.
Office Action from U.S. Appl. No. 12/969,637 issued on Dec. 12, 2012; 11 pages.
Sobrado, L. & Birget, J. C., "Shoulder-Surfing resistant graphical passwords—Draft" New Jersey, USA;Apr. 11, 2005 pp. 1-8.
Sobrado, L. et al., "Graphical Passwords", 2002, The Rutgers Scholar: An Electronic Bulletin of Undergraduate Research, vol. 4, pp. 1-10.
Tan et al.; "Spy-Resistant Keyboard: More Secure Password Entry on Public Touch Screen Displays"; Microsoft Research; Downloaded Jul. 26, 2010; 10 pages.
Office Action for Canadian Application No. 2,760,826 dated Sep. 4, 2013.
Office Action for Canadian Application No. 2,760,337 dated Sep. 4, 2013.
Office Action for Canadian Patent Application No. 2,775,859 dated Nov. 12, 2013.

* cited by examiner

MULTI-LAYER ORIENTATION-CHANGING PASSWORD

CROSS-REFERENCE TO RELATED APPLICATIONS

The present application is related to commonly owned U.S. application Ser. Nos. 12/969,647 entitled "ADJUSTING THE POSITION OF AN ENDPOINT REFERENCE FOR INCREASING SECURITY DURING DEVICE LOG-ON"; 12/969,878 entitled "VISUAL OR TOUCHSCREEN PASSWORD ENTRY"; 12/969,646 entitled "PRESSURE-SENSITIVE MULTI-LAYER PASSWORDS"; 12/969,797 entitled "OBSCURING VISUAL LOGIN"; 12/969,643 entitled "MULTI-LAYER MULTI-POINT OR PATHWAY-BASED PASSWORDS"; 12/969,640 entitled "MULTI-LAYERED COLOR-SENSITIVE PASSWORDS"; 12/969,638 entitled "SIMPLE ALGEBRAIC AND MULTI-LAYER PASSWORDS"; 12/969,637 entitled "MULTI-LAYER MULTI-POINT OR RANDOMIZED PASSWORDS"; 12/969,633 entitled "PASSWORD ENTRY USING 3D IMAGE WITH SPATIAL ALIGNMENT"; and 12/969,629 entitled "PASSWORD ENTRY USING MOVING IMAGES"; all of which were filed on the same date as this application and are incorporated herein.

TECHNICAL FIELD

The present disclosure relates generally to graphical authentication.

BACKGROUND

Passwords may be used in many situations where a user needs to be authenticated. Situations requiring authentication may include the ability to access or use a computer, mobile phone, PDA, or any other device. They may also enable access to a physical location, or allow use of a credit/debit card or similar instrument. Passwords are typically alphanumeric strings or sequences entered on a keyboard. Graphical authentication systems, where passwords are comprised of graphical components, also exist.

BRIEF DESCRIPTION OF THE DRAWINGS

Like reference numerals are used in the drawings to denote like elements and features.

DETAILED DESCRIPTION OF EXAMPLE EMBODIMENTS

Figure 1:
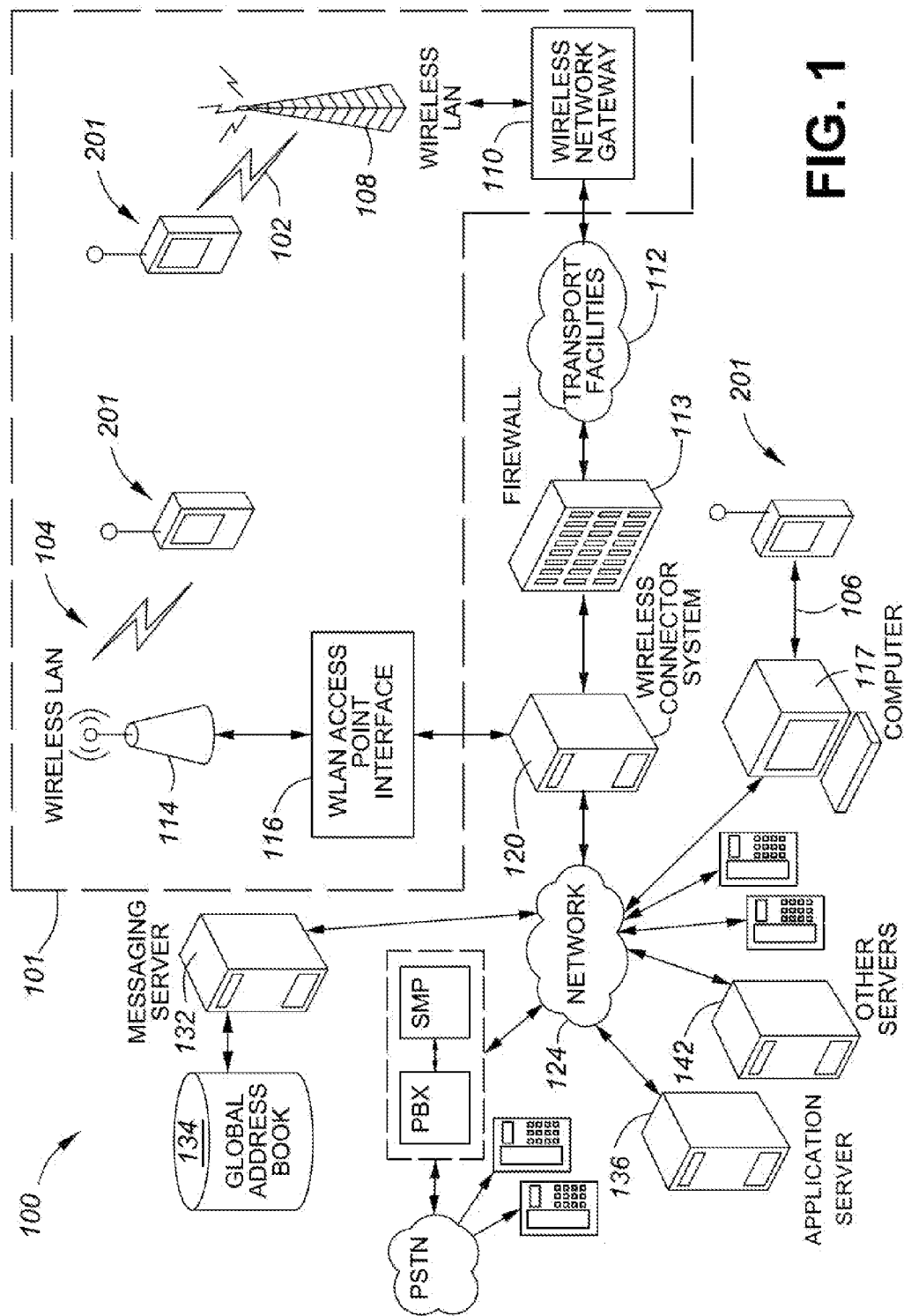
FIG. 1 is a block diagram illustrating a communication system including a mobile communication device in which example embodiments of the present disclosure can be applied.

In some graphical authentication systems, a user must move a previously selected reference point on an overlay image, such as a grid, to a previously selected reference point on a base image. With existing graphical authentication systems, "shoulder surfing" can occur. For example, a third party observer may be able to determine where a cursor is located at the end of the authentication process. In some situations, a third party observer need only observe where the user's fingers are pointing. In other situations, a computer algorithm could be used to determine a pattern of where certain points on the overlay image are located at the end of the authentication process.

The present application proposes a method for authenticating a user of a computing device in which an added action of changing the orientation of one of the image in a graphical authentication system is required for positive authentication.

For added security, in some implementations, the modified base image disappears while the modified overlay image is displayed. To align the reference points, the user is required to remember where the base image reference point appeared on the display. In some embodiments, a tolerance zone is adjusted to accommodate for the user not being able to see the base image reference point after the initial display of the modified base image.

In one aspect, there is provided one or more computer readable media having computer readable instructions stored thereon that when executed by a processor implement a method of authenticating a user of a computing device, the computing device having a memory storing a base image and an overlay image, the base image having a pre-selected base image reference point, and the overlay image having a pre-selected overlay image reference point, the method comprising: generating a modified base image; generating a modified overlay image; displaying, on a display, the modified base image overlaid by the modified overlay image; receiving an input for moving one of the modified base image and the modified overlay image; moving the one of the modified base image and the modified overlay image in response to the input; receiving a further input to change an orientation of at least one of the modified base image and the modified overlay image; and in response to alignment of the base image reference point on the modified base image with the overlay image reference point on the modified overlay image at a point on the display and the orientation of the at least one of the modified base image and the modified overlay image matching a pre-selected orientation criterion, indicating positive authentication.

In another aspect, there is provided a method of authenticating a user of a computing device, the computing device having a memory storing a base image and an overlay image, the base image having a pre-selected base image reference point, and the overlay image having a pre-selected overlay image reference point, the method comprising: generating a modified base image; generating a modified overlay image; displaying, on a display, the modified base image overlaid by the modified overlay image; receiving an input for moving one of the modified base image and the modified overlay image; moving the one of the modified base image and the modified overlay image in response to the input; receiving a further input to change an orientation of at least one of the modified base image and the modified overlay image; and in response to alignment of the base image reference point on the modified base image with the overlay image reference point on the modified overlay image at a point on the display and the orientation of the at least one of the modified base image and the modified overlay image matching a pre-selected orientation criterion, indicating positive authentication.

In another aspect, there is provided a computing device comprising: a processor; a display; and one or more computer readable media having computer readable instructions stored thereon that when executed by the processor implement a method of authenticating a user of the computing device, the computing device having a memory storing a base image and an overlay image, the base image having a pre-selected base image reference point, and the overlay image having a pre-selected overlay image reference point, the method including generating a modified base image; generating a modified overlay image; displaying, on the display, the modified base image overlaid by the modified overlay image; receiving an input for moving one of the modified base image and the modified overlay image; moving the one of the modified base image and the modified overlay image in response to the input; assigning a security level requirement for authenticating the user; receiving a further input to change an orientation of at least one of the modified base image and the modified overlay image; and in response to alignment of the base image reference point on the modified base image with the overlay image reference point on the modified overlay image at a point on the display and the orientation of the at least one of the modified base image and the modified overlay image matching a pre-selected orientation criterion, indicating positive authentication.

Embodiments of the present application are not limited to any particular operating system, mobile device architecture, server architecture, or computer programming language.

Reference is first made to FIG. 1 which shows in block diagram form a communication system 100 in which example embodiments of the present disclosure can be applied. The communication system 100 comprises a number of mobile communication devices (mobile devices) 201 which may be connected to the remainder of system 100 in any of several different ways. Accordingly, several instances of mobile communication devices 201 are depicted in FIG. 1 employing different example ways of connecting to system 100. Mobile communication devices 201 are connected to a wireless communication network 101 which may comprise one or more of a Wireless Wide Area Network (WWAN) 102 and a Wireless Local Area Network (WLAN) 104 or other suitable network arrangements. In some embodiments, the mobile communication devices 201 are configured to communicate over both the WWAN 102 and WLAN 104, and to roam between these networks. In some embodiments, the wireless network 101 may comprise multiple WWANs 102 and WLANs 104.

The WWAN 102 may be implemented as any suitable wireless access network technology. By way of example, but not limitation, the WWAN 102 may be implemented as a wireless network that includes a number of transceiver base stations 108 (one of which is shown in FIG. 1) where each of the base stations 108 provides wireless Radio Frequency (RF) coverage to a corresponding area or cell. The WWAN 102 is typically operated by a mobile network service provider that provides subscription packages to users of the mobile communication devices 201. In some embodiments, the WWAN 102 conforms to one or more of the following wireless network types: Mobitex Radio Network, DataTAC, GSM (Global System for Mobile Communication), GPRS (General Packet Radio System), TDMA (Time Division Multiple Access), CDMA (Code Division Multiple Access), CDPD (Cellular Digital Packet Data), iDEN (integrated Digital Enhanced Network), EvDO (Evolution-Data Optimized) CDMA2000, EDGE (Enhanced Data rates for GSM Evolution), UMTS (Universal Mobile Telecommunication Systems), HSDPA (High-Speed Downlink Packet Access), IEEE 802.16e (also referred to as Worldwide Interoperability for Microwave Access or "WiMAX), or various other networks. Although WWAN 102 is described as a "Wide-Area" network, that term is intended herein also to incorporate wireless Metropolitan Area Networks (WMAN) and other similar technologies for providing coordinated service wirelessly over an area larger than that covered by typical WLANs.

The WWAN 102 may further comprise a wireless network gateway 110 which connects the mobile communication devices 201 to transport facilities 112, and through the transport facilities 112 to a wireless connector system 120. Transport facilities may include one or more private networks or lines, the public internet, a virtual private network, or any other suitable network. The wireless connector system 120 may be operated, for example, by an organization or enterprise such as a corporation, university, or governmental department, which allows access to a network 124 such as an internal or enterprise network and its resources, or the wireless connector system 120, may be operated by a mobile network provider. In some embodiments, the network 124 may be realised using the Internet rather than an internal or enterprise network.

The wireless network gateway 110 provides an interface between the wireless connector system 120 and the WWAN 102, which facilitates communication between the mobile communication devices 201 and other devices (not shown) connected, directly or indirectly, to the WWAN 102. Accordingly, communications sent via the mobile communication devices 201 are transported via the WWAN 102 and the wireless network gateway 110 through transport facilities 112 to the wireless connector system 120. Communications sent from the wireless connector system 120 are received by the wireless network gateway 110 and transported via the WWAN 102 to the mobile communication devices 201.

The WLAN 104 comprises a wireless network which, in some embodiments, conforms to IEEE 802.11x standards (sometimes referred to as Wi-Fi) such as, for example, the IEEE 802.11a, 802.11b and/or 802.11g standard. Other communication protocols may be used for the WLAN 104 in other embodiments such as, for example, IEEE 802.11n, IEEE 802.16e (also referred to as Worldwide Interoperability for Microwave Access or "WiMAX"), or IEEE 802.20 (also referred to as Mobile Wireless Broadband Access). The WLAN 104 includes one or more wireless RF Access Points (AP) 114 (one of which is shown in FIG. 1) that collectively provide a WLAN coverage area.

The WLAN 104 may be a personal network of the user, an enterprise network, or a hotspot offered by an Internet service provider (ISP), a mobile network provider, or a property owner in a public or semi-public area, for example. The access points 114 are connected to an access point (AP) interface 116 which may connect to the wireless connector system 120 directly (for example, if the access point 114 is part of an enterprise WLAN 104 in which the wireless connector system 120 resides), or indirectly via the transport facilities 112 if the access point 114 is a personal Wi-Fi network or Wi-Fi hotspot (in which case a mechanism for securely connecting to the wireless connector system 120, such as a virtual private network (VPN), may be appropriate). The AP interface 116 provides translation and routing services between the access points 114 and the wireless connector system 120 to facilitate communication, directly or indirectly, with the wireless connector system 120.

The wireless connector system 120 may be implemented as one or more servers, and is typically located behind a firewall 113. The wireless connector system 120 manages communications, including email messages, to and from a set of managed mobile communication devices 201. The wireless connector system 120 also provides administrative control and management capabilities over users and mobile communication devices 201 which may connect to the wireless connector system 120.

The wireless connector system 120 allows the mobile communication devices 201 to access the network 124 and connected resources and services such as a messaging server 132 (for example, a Microsoft Exchange™, IBM Lotus Domino™, or Novell GroupWise™ email messaging server) having a global address book 134, and optionally other servers 142. The other servers 142 may comprise a content server for providing content such as Internet content or content from an organization's internal servers to the mobile communication devices 201 in the wireless network 101, and an application server for implementing server-based applications.

The global address book 134 comprises electronic contact records generated and maintained by an IT (information technology) administrator of the network 124. Typically, the global address book is maintained exclusively by the messaging server 132 and there is no local copy on the mobile device 201. In addition, the global address book typically comprises contact records for all users of the respective network 124 (e.g., enterprise). The contact records in the global address book 134 may be one or more of individual contact records (or user records) or a group address or distribution list which lists multiple individual (users).

The wireless connector system 120 typically provides a secure exchange of data (e.g., email messages, personal information manager (PIM) data, and IM data) with the mobile communication devices 201. In some embodiments, communications between the wireless connector system 120 and the mobile communication devices 201 are encrypted. In some embodiments, communications are encrypted using a symmetric encryption key implemented using Advanced Encryption Standard (AES) or Triple Data Encryption Standard (Triple DES) encryption. Private encryption keys are generated in a secure, two-way authenticated environment and are used for both encryption and decryption of data.

The wireless network gateway 110 is adapted to send data packets received from the mobile device 201 over the WWAN 102 to the wireless connector system 120. The wireless connector system 120 then sends the data packets to the appropriate connection point such as the messaging server 132, content server or application server 136. Conversely, the wireless connector system 120 sends data packets received, for example, from the messaging server 132 or other server 142 to the wireless network gateway 110 which then transmit the data packets to the destination mobile device 201. The AP interfaces 116 of the WLAN 104 provide similar sending functions between the mobile device 201, the wireless connector system 120 and network connection point such as the messaging server 132, content server and application server 136.

The network 124 may comprise a private local area network, metropolitan area network, wide area network, the public internet or combinations thereof and may include virtual networks constructed using any of these, alone, or in combination. Computers 117 may be connected to the network 124 directly or indirectly via an intermediate communication network such as the Internet. When computers 117 connect to the network indirectly, e.g. via the Internet, a VPN or other mechanism for securely connecting to the network 124 may be appropriate. Computers 117 may be of any suitable construction and include at least a processor, and a display screen, one or more user input devices, and a memory each connected to the processor as is known in the art. The computers 117 could be desktop computers, laptop/notebook/netbook computers, or combinations thereof, and may have wired or wireless communication subsystems for connecting to the network 124.

A mobile device 201 may alternatively connect to the wireless connector system 120 using a computer 117 via the network 124. In at least some embodiments, for security purposes the computers 117 with which the mobile devices 201 can connect to the wireless connector system 120 are limited to computers 117 which are directly connected to the network 124. A link 106 may be provided for exchanging information between the mobile device 201 and computer 117 connected to the wireless connector system 120. The link 106 may comprise one or both of a physical interface and short-range wireless communication interface. The physical interface may comprise one or combinations of an Ethernet connection, Universal Serial Bus (USB) connection, Firewire™ (also known as an IEEE 1394 interface) connection, or other serial data connection, via respective ports or interfaces of the mobile device 201 and computer 117. The short-range wireless communication interface may be a personal area network (PAN) interface. A personal area network is a wireless point-to-point connection meaning no physical cables are required to connect the two end points.

It will be appreciated that the above-described communication system is provided for the purpose of illustration only, and that the above-described communication system comprises one possible communication network configuration of a multitude of possible configurations for use with the mobile communication devices 201. The teachings of the present disclosure may be employed in connection with any other type of network and associated devices that are effective in implementing or facilitating wireless communication. Suitable variations of the communication system will be understood to a person of skill in the art and are intended to fall within the scope of the present disclosure.

Figure 2:
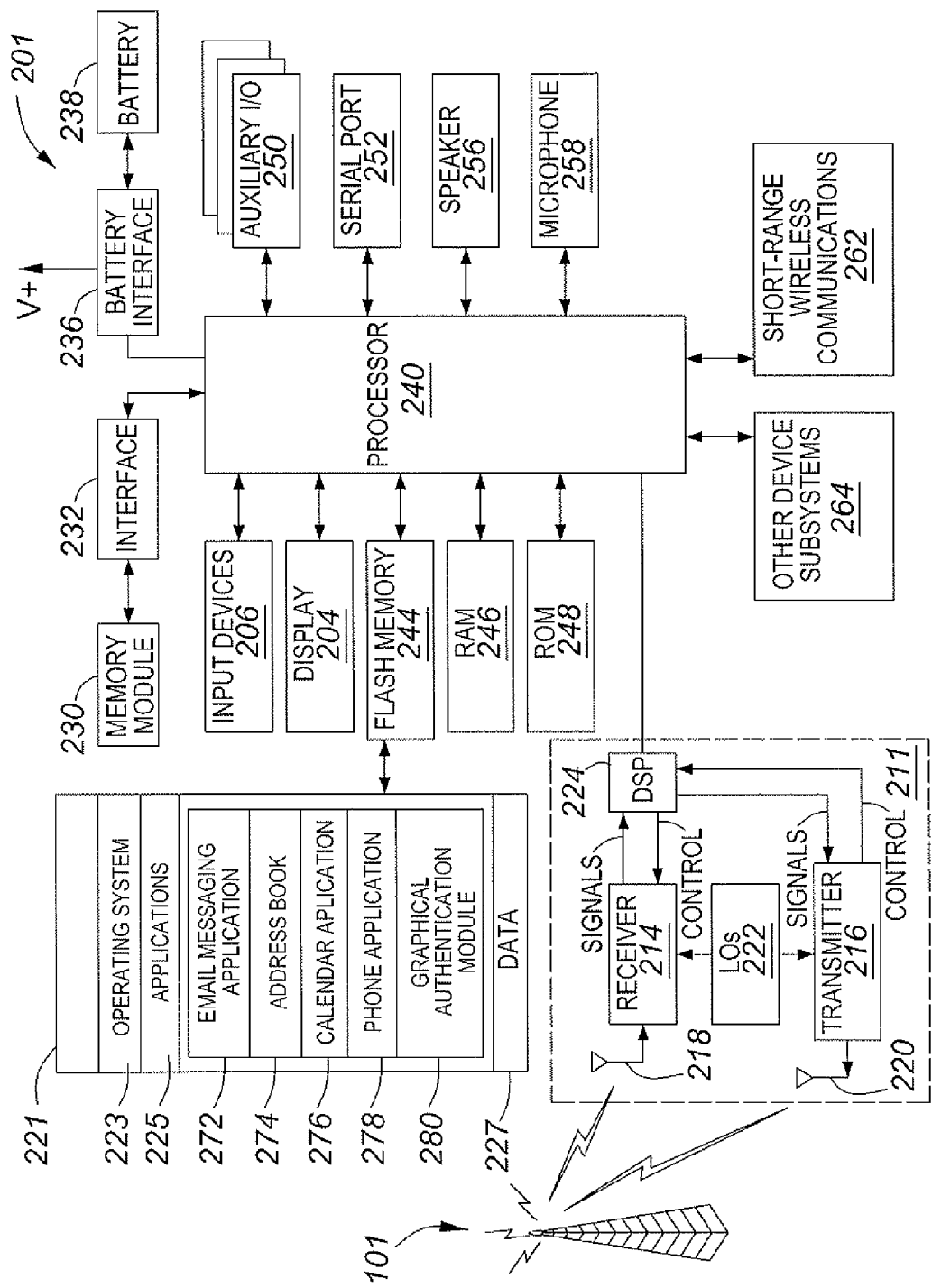
FIG. 2 is a block diagram illustrating a mobile communication device in accordance with one example embodiment of the present disclosure.

Reference is now made to FIG. 2 which illustrates an exemplary embodiment of the mobile device 201 in which example embodiments described in the present disclosure can be applied. The mobile device 201 is a two-way communication device having data and voice communication capabilities, and the capability to communicate with other computer systems, for example, via the Internet. Depending on the functionality provided by the mobile device 201, in various embodiments the device 201 may be a multiple-mode communication device configured for both data and voice communication, a smartphone, a mobile telephone or a PDA (personal digital assistant) enabled for wireless communication, or a computer system with a wireless modem.

The mobile device 201 includes a rigid case (not shown) housing the components of the device 201. The internal components of the device 201 are constructed on a printed circuit board (PCB). The mobile device 201 includes a controller comprising at least one processor 240 (such as a microprocessor) which controls the overall operation of the device 201. The processor 240 interacts with device subsystems such as a wireless communication subsystem 211 (sometimes referred to as a radio layer) for exchanging radio frequency signals with the wireless network 101 to perform communication functions. The processor 240 interacts with additional device subsystems including a display screen 204 such as a liquid crystal display (LCD) screen, input devices 206 such as a keyboard and control buttons, flash memory 244, random access memory (RAM) 246, read only memory (ROM) 248, auxiliary input/output (I/O) subsystems 250, data port 252 such as serial data port, such as a Universal Serial Bus (USB) data port, speaker 256, microphone 258, short-range communication subsystem 262, and other device subsystems generally designated as 264. Some of the subsystems shown in FIG. 2 perform communication-related functions, whereas other subsystems may provide "resident" or on-device functions.

The device 201 may comprise a touch screen display in some embodiments. The touch screen display may be constructed using a touch-sensitive input surface connected to an electronic controller and which overlays the display screen 204. The touch-sensitive overlay and the electronic controller provide a touch-sensitive input device and the processor 240 interacts with the touch-sensitive overlay via the electronic controller. In some embodiments, a touch screen is integrated directly with the display. In still other embodiments, a touch screen is placed behind the display.

The communication subsystem 211 includes a receiver 214, a transmitter 216, and associated components, such as one or more antenna elements 218 and 220, local oscillators (LOs) 222, and a processing module such as a digital signal processor (DSP) 224. The antenna elements 218 and 220 may be embedded or internal to the mobile device 201 and a single antenna may be shared by both receiver and transmitter, as is known in the art. As will be apparent to those skilled in the field of communication, the particular design of the wireless communication subsystem 211 depends on the wireless network 101 in which mobile device 201 is intended to operate.

The mobile device 201 may communicate with any one of a plurality of fixed transceiver base stations 108 of the wireless network 101 within its geographic coverage area. The mobile device 201 may send and receive communication signals over the wireless network 101 after the required network registration or activation procedures have been completed. Signals received by the antenna 218 through the wireless network 101 are input to the receiver 214, which may perform such common receiver functions as signal amplification, frequency down conversion, filtering, channel selection, etc., as well as analog-to-digital (A/D) conversion. A/D conversion of a received signal allows more complex communication functions such as demodulation and decoding to be performed in the DSP 224. In a similar manner, signals to be transmitted are processed, including modulation and encoding, for example, by the DSP 224. These DSP-processed signals are output to the transmitter 216 for digital-to-analog (D/A) conversion, frequency up conversion, filtering, amplification, and transmission to the wireless network 101 via the antenna 220. The DSP 224 not only processes communication signals, but may also provide for receiver and transmitter control. For example, the gains applied to communication signals in the receiver 214 and the transmitter 216 may be adaptively controlled through automatic gain control algorithms implemented in the DSP 224.

The processor 240 operates under stored program control and executes software modules 221 stored in memory such as persistent memory, for example, in the flash memory 244. As illustrated in FIG. 2, the software modules 221 comprise operating system software 223, software applications 225 comprising an email messaging application 272 (also referred to as an email client 272), a personal address book 274, a calendar application 276, a phone application 278, and graphical authentication module 280. Example embodiments of the graphical authentication module 280 will be discussed in detail later herein. It is recognized that the graphical authentication module 280 and its various components as described herein can form a discrete module running on the device 201, or the functions of the graphical authentication module 280 can be distributed on the device 201 as separate modules or integrated within other existing modules as desired. Such discrete or distributed implementations all fall within the embodiments of the graphical authentication module 280 as described herein.

The software applications 225 also may include a range of applications, including, for example, a notepad application, Internet browser application, voice communication (i.e. telephony) application, mapping application, or a media player application, or any combination thereof. Each of the software applications 225 may include layout information defining the placement of particular fields and graphic elements (e.g. text fields, input fields, icons, etc.) in the user interface (i.e. the display screen 204) according to the application.

Those skilled in the art will appreciate that the software modules 221 or parts thereof may be temporarily loaded into volatile memory such as the RAM 246. The RAM 246 is used for storing runtime data variables and other types of data or information, as will be apparent to those skilled in the art. Although specific functions are described for various types of memory, this is merely one example, and those skilled in the art will appreciate that a different assignment of functions to types of memory could also be used.

In some embodiments, the auxiliary I/O subsystems 250 may comprise an external communication link or interface, for example, an Ethernet connection. The mobile device 201 may comprise other wireless communication interfaces for communicating with other types of wireless networks, for example, a wireless network such as an orthogonal frequency division multiplexed (OFDM) network or a GPS (Global Positioning System) subsystem comprising a GPS receiver or transceiver for communicating with a GPS satellite network (not shown). The auxiliary I/O subsystems 250 may comprise a pointing or navigational input device such as a touchpad, a clickable trackball or scroll wheel or thumbwheel, or a vibrator for providing vibratory notifications in response to various events on the device 201 such as receipt of an electronic message or incoming phone call, or for other purposes such as haptic feedback (touch feedback).

In some embodiments, the mobile device 201 also includes a removable memory card or module 230 (typically comprising flash memory) and a memory card interface 232. Network access is typically associated with a subscriber or user of the mobile device 201 via the memory card 230, which may be a Subscriber Identity Module (SIM) card for use in a GSM network or other type of memory card for use in the relevant wireless network type. The memory card 230 is inserted in or connected to the memory card interface 232 of the mobile device 201 in order to operate in conjunction with the wireless network 101.

The mobile device 201 also stores other data 227 in an erasable persistent memory, which in one example embodiment is the flash memory 244. In various embodiments, the data 227 includes service data comprising information required by the mobile device 201 to establish and maintain communication with the wireless network 101. The data 227 may also include user application data such as email messages, address book and contact information, calendar and schedule information, notepad documents, image files, and other commonly stored user information stored on the mobile device 201 by its user, and other data. The data 227 stored in the persistent memory (e.g. flash memory 244) of the mobile device 201 may be organized, at least partially, into a number of databases each containing data items of the same data type or associated with the same application. For example, email messages, contact records, and task items may be stored in individual databases within the device memory.

The mobile device 201 also includes a battery 238 as a power source, which is typically one or more rechargeable batteries that may be charged, for example, through charging circuitry coupled to a battery interface such as the serial data port 252. The battery 238 provides electrical power to at least some of the electrical circuitry in the mobile device 201, and the battery interface 236 provides a mechanical and electrical connection for the battery 238. The battery interface 236 is coupled to a regulator (not shown) which provides power V+ to the circuitry of the mobile device 201.

The short-range communication subsystem 262 is an additional optional component which provides for communication between the mobile device 201 and different systems or devices, which need not necessarily be similar devices. For example, the subsystem 262 may include an infrared device and associated circuits and components, or a wireless bus protocol compliant communication mechanism such as a Bluetooth® communication module to provide for communication with similarly-enabled systems and devices.

A predetermined set of applications that control basic device operations, including data and voice communication applications will normally be installed on the mobile device 201 during or after manufacture. Additional applications and/or upgrades to the operating system 221 or software applications 225 may also be loaded onto the mobile device 201 through the wireless network 101, the auxiliary I/O subsystem 250, the serial port 252, the short-range communication subsystem 262, or other suitable subsystem 264. The downloaded programs or code modules may be permanently installed, for example, written into the program memory (i.e. the flash memory 244), or written into and executed from the RAM 246 for execution by the processor 240 at runtime. Such flexibility in application installation increases the functionality of the mobile device 201 and may provide enhanced on-device functions, communication-related functions, or both. For example, secure communication applications may enable electronic commerce functions and other such financial transactions to be performed using the mobile device 201.

The mobile device 201 may provide two principal modes of communication: a data communication mode and a voice communication mode. In the data communication mode, a received data signal such as a text message, an email message, or Web page download will be processed by the communication subsystem 211 and input to the processor 240 for further processing. For example, a downloaded Web page may be further processed by a browser application or an email message may be processed by the email messaging application and output to the display 204. A user of the mobile device 201 may also compose data items, such as email messages, for example, using the input devices in conjunction with the display screen 204. These composed items may be transmitted through the communication subsystem 211 over the wireless network 101.

In the voice communication mode, the mobile device 201 provides telephony functions and operates as a typical cellular phone. The overall operation is similar, except that the received signals are output to the speaker 256 and signals for transmission are generated by a transducer such as the microphone 258. The telephony functions are provided by a combination of software/firmware (i.e., the phone application 278) and hardware (i.e., the microphone 258, the speaker 256 and input devices). Alternative voice or audio I/O subsystems, such as a voice message recording subsystem, may also be implemented on the mobile device 201. Although voice or audio signal output is typically accomplished primarily through the speaker 256, the display screen 204 may also be used to provide an indication of the identity of a calling party, duration of a voice call, or other voice call related information.

The phone application 278 can be split into multiple applications or sub-modules, for example one or more user phone modules and a call control module. The user phone modules provide a variety of telephony features through a user interface, while the call control module provides access to common telephony functions desired by the user phone modules, such that telephony requests from phone modules can be coordinated and so that the user phone modules do not need to each provide instructions understood by the wireless communications subsystem 211. The call control function typically makes telephony features available to user phone modules through an application programming interface (API). It is to be recognized that all or part of the phone application 278 features or functions could be provided through the operating system or otherwise distributed in the device 201, while continuing to fall within the term phone application 278.

Figure 3:
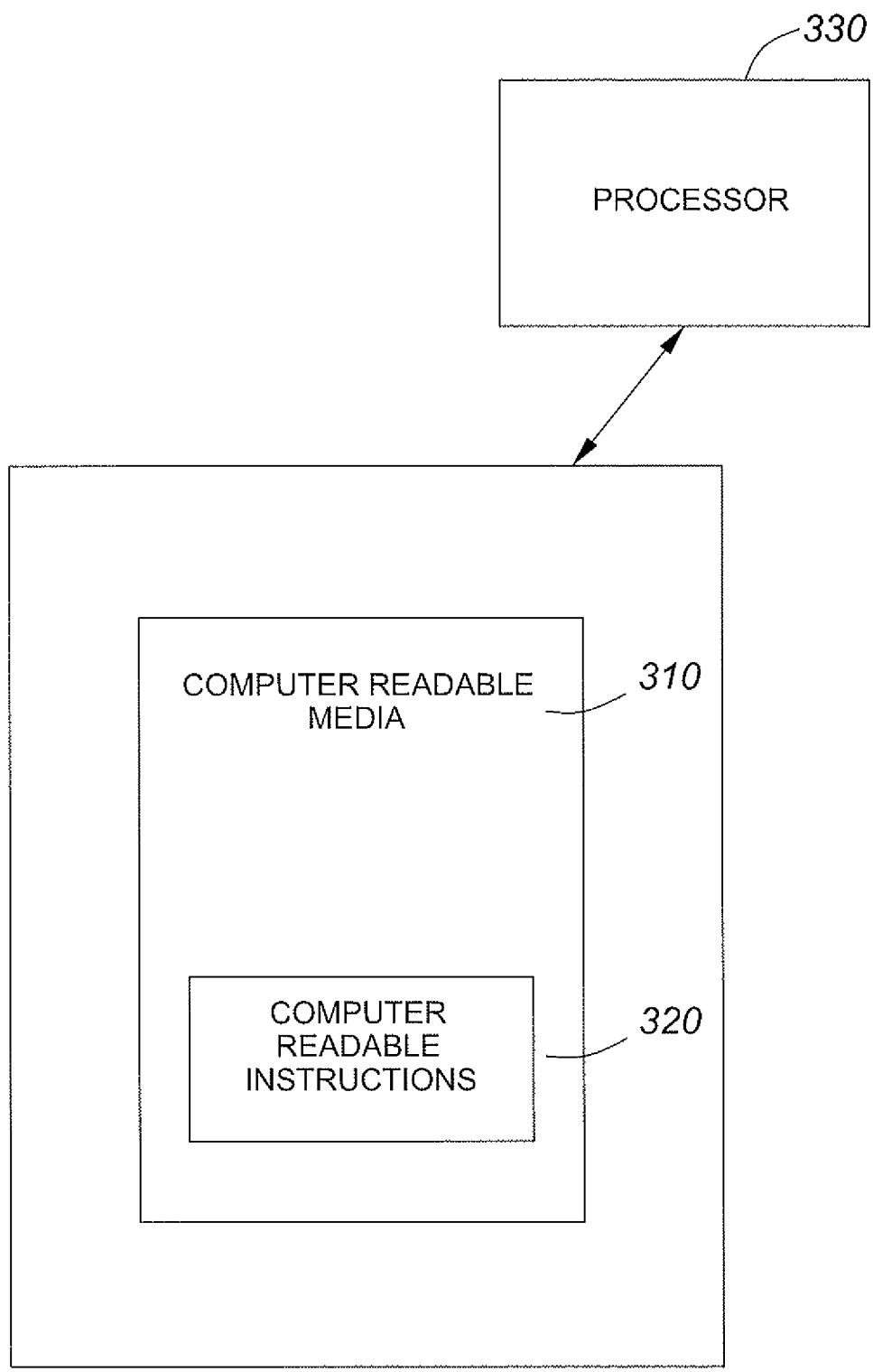
FIG. 3 is a block diagram illustrating an authentication module in accordance with one example embodiment of the present disclosure.

Referring now to FIG. 3, an exemplary embodiment of computer readable media 310 will be described. The computer readable media 310 have computer readable instructions 320 stored thereon that when implemented cause a processor 330 to execute any one of the methods described herein. For the purposes of the application, computer readable media comprise any tangible computer storage, such as but not limited to flash memory, read only memory, CD, DVD and memory sticks. Graphical authentication module 280 described above with reference to FIG. 2 is an exemplary implementation of computer readable media 310. However, it is to be understood that the computer readable media 310 is not limited to use on mobile devices, such as mobile device 210 described above. Non-limiting examples of the processor 330 include a CPU (central processing unit) on a personal computer, laptop computer, tablet device, personal digital assistant (PDA), mobile telephone, smart phone, bank machine, and digital authentication system for entry to rooms or buildings, or control system. Any device with a processor, a display and a user interface enabling a user to move images on the display could feasibly make use of the computer readable media 310 to authenticate users.

A flow chart of a method implemented by the processor 330 is shown in FIG. 4. The method is a method of authenticating a user of a computing device, the computing device having a memory storing a base image and an overlay image, the base image having a pre-selected base image reference point, and the overlay image having a pre-selected overlay image reference point. The method starts with generating 410 a modified base image and generating 420 a modified overlay image. Then the method continues with displaying 430, on a display, the modified base image overlaid by the modified overlay image. Action 440 of the method is receiving an input for moving one of the modified base image and the modified overlay image. Then the method continues with moving 450 the one of the modified base image and the modified overlay image in response to the input. At action 460, a further input is received to change an orientation of at least one of the modified base image and the modified overlay image. Finally, at action 470, in response to alignment of the base image reference point on the modified base image with the overlay image reference point on the modified overlay image at a point on the display and the orientation of the at least one of the modified base image and the modified overlay image matching a pre-selected orientation criterion, positive authentication is indicated. Non-limiting examples of indicating positive authentication include: providing a visual indicator; providing an audible indicator; and allowing user access.

Figure 4A:
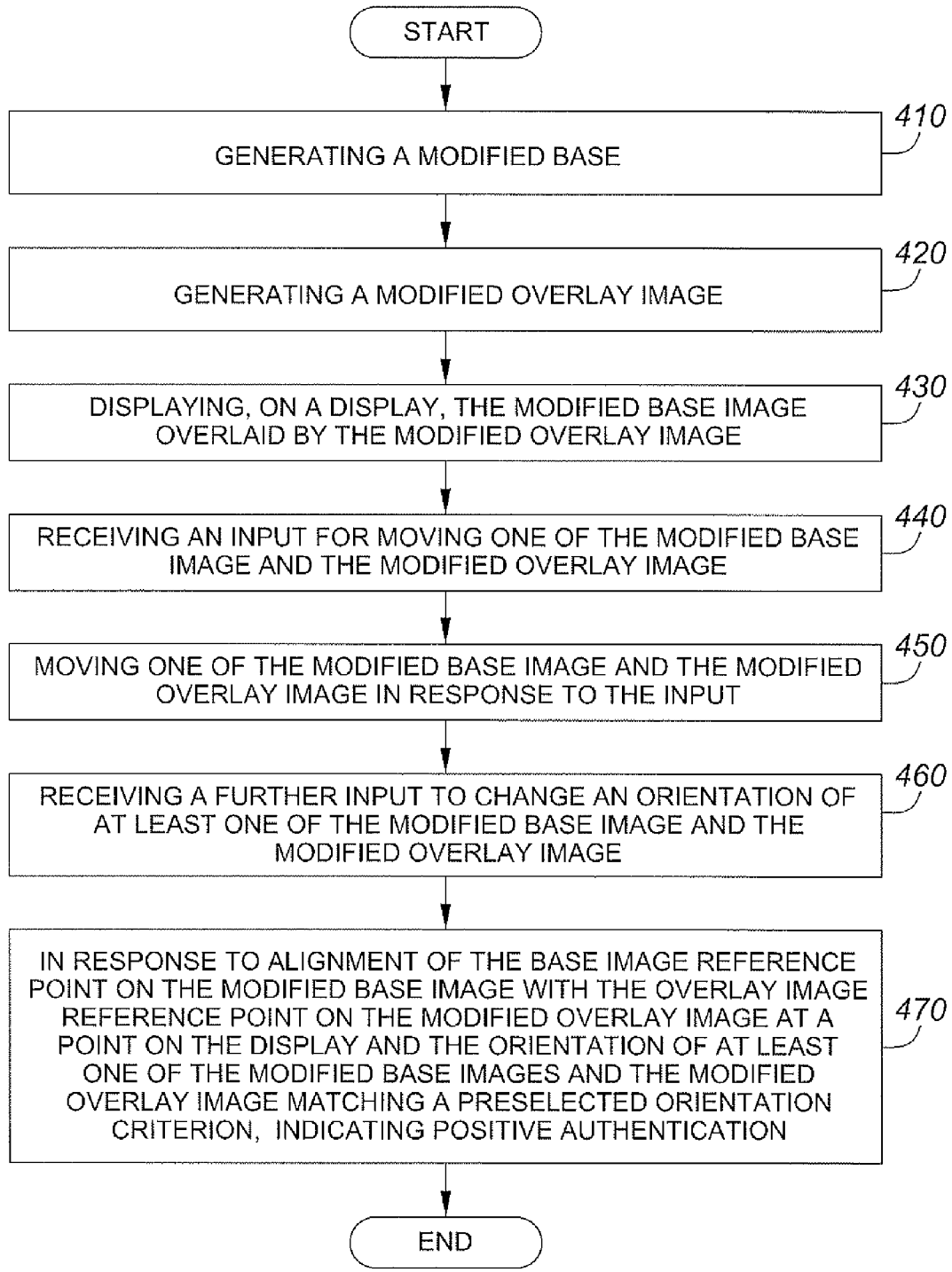
FIGS. 4a and 4b are flowcharts illustrating a method in accordance with one example embodiment of the present disclosure.
Figure 4B:
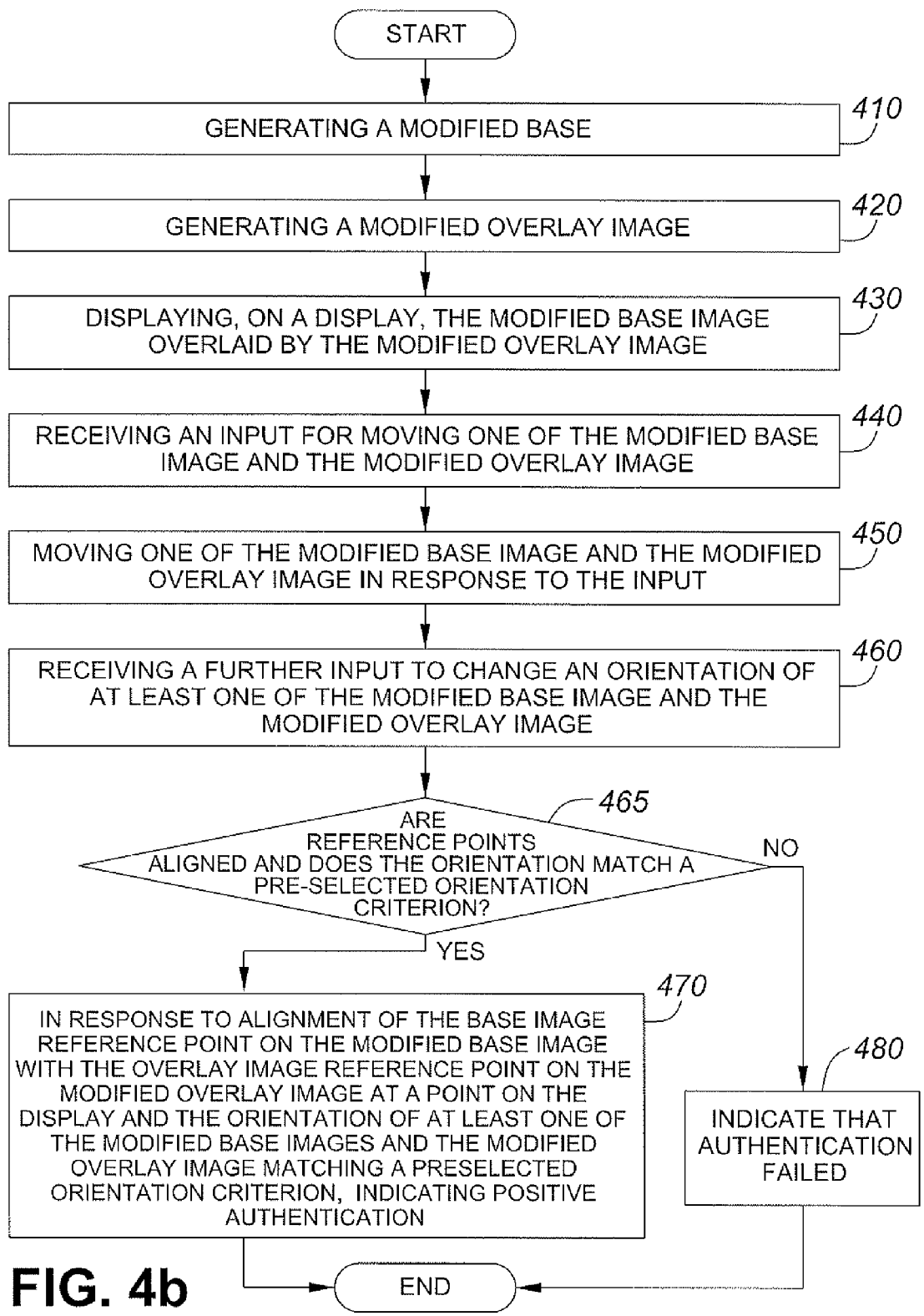

Referring now to FIG. 4b, another example method will be described. The method in FIG. 4b starts with actions 410, 420, 430, 440, 450, and 460 from FIG. 4a. Then, after receiving the further input, a determination 465 is made of whether or not the base image reference point and the overlay image reference point are aligned AND whether or not the orientation of the at least one of the modified base image and the modified overlay image matches a pre-selected orientation criterion. If the determination is that there is alignment and that the orientation matches the pre-selected orientation criterion, the method proceeds to action 470 which is the same as action 470 in FIG. 4a, that is indicating positive authentication. If there is no alignment or if the security level requirement was not met, the method proceeds to indicating 480 that authentication failed.

The indication that authentication failed in some embodiments is an audio signal. In some embodiments, the indication that authentication failed is a visual output on the display. In some embodiments, if authentication failed, the method starts over. In some embodiments, after a set number of failed authentication attempts, a user is locked out and not permitted to attempt authentication again. In some embodiments, the user is locked out until an administrator overrides the lock out. In other embodiments, the lock out is for a set time period.

In some embodiments the method further comprises timing the authentication attempt. If positive authentication is not indicated within a time limit, the method proceeds to action 480, i.e. indicating that authentication failed.

In an alternate embodiment, when the overlay image is moved, the modified base image disappears. In other words, the moving comprises moving the overlay image and the method further comprises removing the modified base image from the display in response to receiving the input. Therefore, the user must remember where the base image reference point was located on the display and align the overlay image reference point without being able to see it. This adds security in that a third party can not see any two points being aligned. However, tolerances for alignment would likely be less strict than in the case where the user can see the base image reference point.

In some embodiments, the input or the further input is received from a touchscreen display. In some embodiments, the input or the further input is received from a multi-touch screen. A non-limiting example of a touchscreen display that may be used include but are not limited to a capacitive multi-touch touchscreen.

Where a multi-touch screen is used, the further input in some embodiments comprises two or more touches on the multi-touch screen. For example, the user may be required to put two fingers on the screen in order to rotate the appropriate image to the desired orientation.

In still other embodiments, the further input is received from a keyboard. For example, arrow keys on a keyboard may be used to change the orientation. Likewise, any key or combination of keys on a keyboard can be assigned a function of rotating a selected image. A keyboard application can be programmed to assign the function to the key or keys.

There are a number of alternatives for when the further input is received or when the change in orientation happens. For example, in some embodiments, the change in orientation happens prior to the moving. In some such embodiments, the orientation must first match the pre-selected orientation criterion before the image can be moved. In other embodiments, if the change in orientation does not result in a match with the pre-selected orientation criterion, the moving is still permitted by authentication will fail. In this manner, if authentication fails, the user will not know if the alignment or the orientation was incorrect, thus providing added security.

In other embodiments, the change in orientation happens after the alignment. In some such embodiments, proper alignment is required in order to change the orientation. In other embodiments, changes in orientation are permitted after movement ceases regardless of whether there is alignment. In other words, there is no indication to the user of whether or not the alignment was correct. This provides added security. Since if authentication fails, the user will not know if it was the alignment or the orientation that was incorrect. In some embodiments, the orientation of both the modified base image and the modified overlay image change concurrently in response to the further input. In some embodiments, the change in orientation is around a pivot point at a location other than the point of alignment.

In non-limiting exemplary embodiments, the base image is a photograph of a scene and the pre-selected reference point is an object or portion of an object in the scene. In other non-limiting embodiments, the base image includes a plurality of abstract objects and the pre-selected reference point is one of the abstract objects. In other embodiments, the base image is a grid of numbers, characters or objects.

In non-limiting embodiments, the overlay image is a grid of numbers, characters or objects. In some embodiments, the pre-selected number, character or object appears more than once in the grid. As with the base image, in some embodiments the pre-selected image in some embodiments is a photo or abstract image. In some cases, when the image is overlaid on the base image, it is presented so that the base image or portions thereof are visible through the overlay image.

In some embodiments, one or both of the overlay image and the base image is a 3-D image. In some embodiments, one or both of the overlay image and the base image have data for three dimensions but are displayed on a 2-D screen. Points in all three dimensions can be selected and movement within the three dimensions is possible in these embodiments. In some embodiments, the images are displayed on a 3-D screen.

In some embodiments, the reference point on either the base image or overlay image or both is represented by a dot, an x or some other symbol next to a recognizable part of the image, such as a number, character, or object. In some embodiments, the dot, x or other symbol appears next to some or all other objects in the image. In some embodiments, the reference point is represented by a number, character or object in the respective image. In some embodiments, aligning the reference points includes bringing one of the references points within a predefined distance of the other reference point. In other words, there may be a tolerance zone. An example of a tolerance zone is an area around a reference point in which a user selection will be interpreted as selection of the reference point. The tolerance zone can be made smaller for increased security or larger where less precision is possible. In some embodiments, the tolerance zone is variable and is made smaller when increased security is required.

While the methods described with reference to FIGS. 4a and 4b refer to one base image and one overlay image and a single reference point on each image, it is to be understood that any number of images and reference points can be used. It is to be understood that the methods described herein are not limited to the order in which the actions are presented herein and that the various actions may be implemented in a different order in other embodiments.

Figure 5:
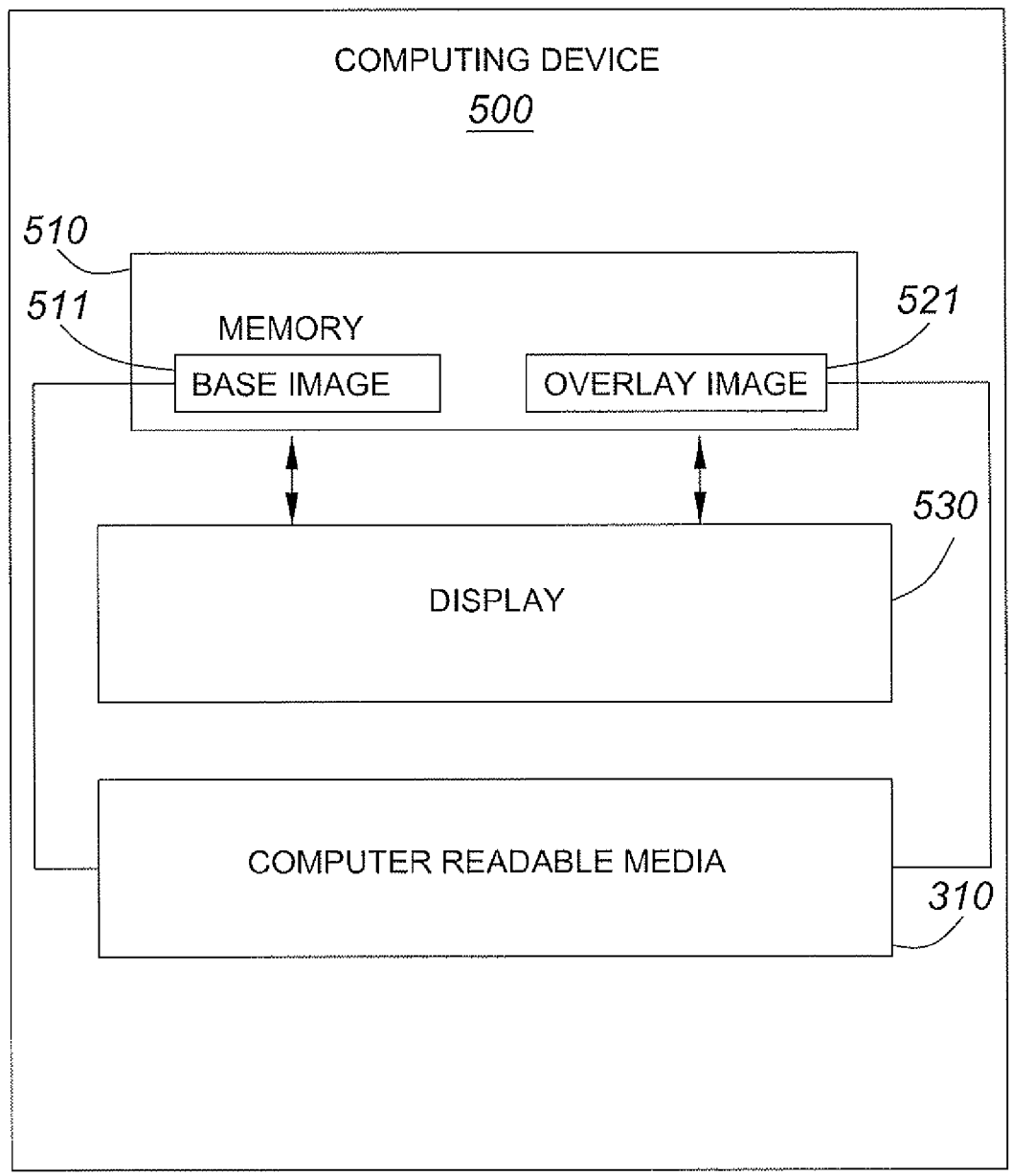
FIG. 5 is a block diagram illustrating a computing device in accordance with one example embodiment of the present disclosure.

In some example embodiments, the computer readable media 310 is located on the computing device. FIG. 5 shows a computing device 500 with computer readable media 310 installed thereon. The computing device 500 also comprises a memory 510 on which the base image 511 and the overlay image 521 are stored. Non-limiting examples of formats for storing the base image 511 and the overlay image 521 are bitmap, PDF, PEG, and PNG. In some embodiments, for example where a grid is used, the format of the image can include different fonts or font technologies. In some embodiments, the memory 510 is an external memory, such as a memory stick or a memory on a server. A display 530 is also provided for displaying representations or modified versions of the base image 511 and the overlay image 521. In some embodiments, the display is a touchscreen.

In some embodiments, one or both of the overlay image and the base image stored in the memory comprises data or instructions for generating the respective image. For example, the stored image can comprise instructions to generate a 2D grid of numbers from 1 to 100.

In some embodiments of the computer readable media 310, generating the modified base image comprises randomly altering the position of the base image reference point on the display. In some embodiments, the base image reference point is altered with respect to the rest of the base image. In other embodiments, generating the modified overlay image comprises randomly altering the position of the overlay image reference point. In some embodiments, both the base image reference point and the overlay image reference point positions are altered.

In some embodiments, one or both of the overlay image and the base image are distorted. Examples of distorting the image include but are not limited to stretching the image (rubber band effect), blurring portions of the image, compressing the image and morphing the image. Another example involves generating a collage of images from the base image or overlay image, where the collage can be reconfigured. In such an embodiment, in presenting the collage or modified image, the respective reference points should be visible and not overlapped. In some embodiments, if the reference point is a number or character, the font can be changed.

In some embodiments, generating the modified base image comprises making a copy of the base image. In some embodiments, the copy is an exact copy. Likewise, in some embodiments, generating the modified overlay image comprises making a copy of the overlay image and the copy of the overlay image, in some cases, can be an exact copy of the overlay image.

Non-limiting examples of presenting the modified images include presenting the respective image at a different location each time the instructions are executed, distorting the appearance of the image and rotating the modified image.

In some embodiments of the computer readable media 310, the input comprises a movement of the modified base image and a movement of the modified overlay image. The modified images are moved by the user using navigation controls on the computing device in some embodiments. For example, a mouse can be used to click and drag the image to be moved. If a touch screen is used, the user can touch and drag one or both images. Other non-limiting navigation controls include keys on a keyboard, a touchpad, a trackball, a thumbwheel and a joystick. In an exemplary embodiment, the input comprises a sequence of movements of the base image and the overlay image. In some embodiments, the representations of the images must be moved in a specific sequence. For example, first move one of the modified base image and the modified overlay image and then move the other of the two so that the respective reference points are aligned. In an exemplary embodiment, individual touch is used to move both planes, i.e. the base image plane and the overlay image plane. In some embodiments, each plane can be moved simultaneously by a different finger if multi-touch input is supported. Some embodiments restrict the movement of each representation in horizontal, diagonal or vertical directions.

In some embodiments, gestures are used to move the modified base image or the modified overlay image or both. For example, pressure or an accelerometer can control the movement.

Screen wrap can also be used in some embodiments to confuse third party observers. Screen wrap can be used in at least two manners. In the first, when part of the image moves off one edge of the display, that part appears immediately on the opposite side. In the first manner, the image is usually the same size as the display. In the second manner, which is sometimes used when the image is larger than the display, part of the image moves off the edge but is not seen immediately on the opposite side. In this case, the third party observer would not see the entire image. In some such embodiments, one or more of the reference points may not be visible on the screen at first and the user has to move the representation of the respective image to bring the reference point into view.

In one embodiment, the overlay image is a grid of numbers and when the modified overlay image is displayed, the grid could move up or down, with only a portion of the grid visible, i.e. higher or lower numbers may not be visible. The user moves the grid to align the pre-selected number with the reference point on the modified base image. In some embodiments, the pre-selected number must be moved up or down to the proper height and then moved left or right to align with the reference point on the base image. The requirement to move a reference point vertically and then horizontally or vice versa can be used in any embodiment and is not limited to a grid of numbers.

Panoramic photos can also be used for either the base image or the overlay image or both. In some such embodiments, the photo is moveable to align the reference points. In some embodiments, the photo is moveable to align a point on the photo with a number on a grid. In some embodiments, the photo is moveable to align a point on the photo with a column and row in a grid corresponding to a pre-selected number. In other embodiments, the photo is moveable left or right only. In other embodiments, the photo is moveable up and down only.

In some embodiments, the overlay image is a grid of images and presenting the modified overlay image comprises altering the position of the pre-selected overlay image reference point while maintaining at least one of a column and a row with images having a common characteristic. In an exemplary embodiment, the grid is a grid of numbers with all of the "x1s" in one column (1, 11, 21, etc.) and all of the "x2s" in another column (2, 12, 22, etc) and so on, but the position of each number with the respective column changes each time the instructions are executed. For example, if the grid is a grid of numbers and the pre-selected reference point on the overlay image is the number 23, each time the grid is presented the reference point will be in a different row and column, but always in the same column as the "20s" and the same row as the "x3s". If the grid consists of shapes of varying sizes, colours or other features, a feature (square shape, for example) could always be in the same column but the position in the column could change. Maintaining the reference point in a column or row with points of a common characteristic provides some assistance to the user in finding the reference point while maintaining the added security of randomly altering the location of the reference point.

In still another embodiment, the grid is randomly generated in response to a user input, such as, but not limited to, a gesture, selecting a key, and a sequence of keystrokes. For example, with a device with an accelerometer, shaking could reset the grid. In other embodiments, the modified base image or the modified overlay image or both could be programmed to reset after a predetermined period of time.

In some embodiments, there are two pre-selected overlay image reference points. To authenticate, the user must move a first overlay image reference point to align with a first base image reference point and then move the base image to align a second base image reference point with a second overlay image reference point. In embodiments, the first and second base image reference points are the same.

Figure 6:
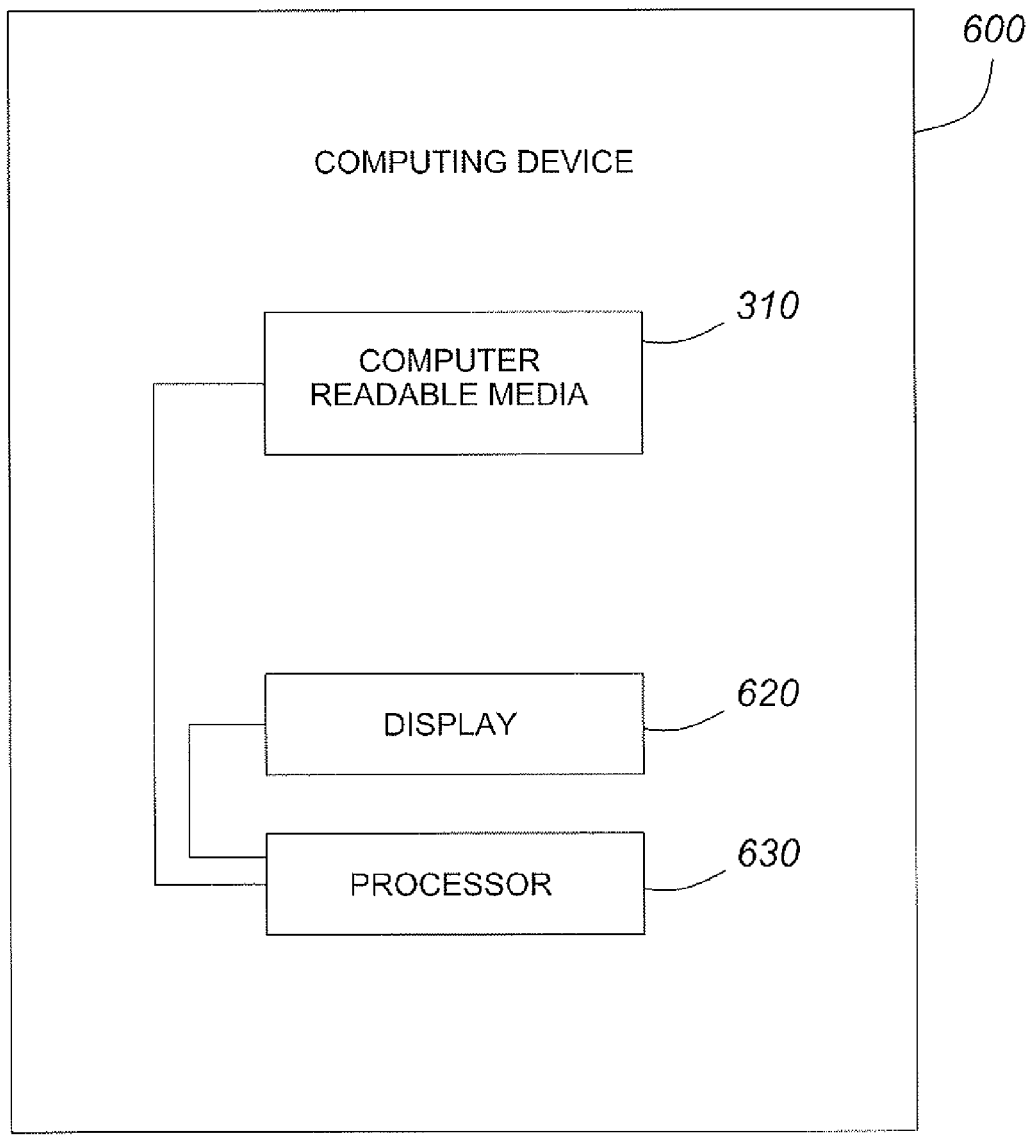
FIG. 6 is a block diagram illustrating a computing device in accordance with one example embodiment of the present disclosure.

Referring to FIG. 6, a computing device 600 will be described. In some embodiments the computing device 600 is a mobile communications device such as the mobile device 201 described herein. However, it is to be understood that the computing device 600 can be any computing device. Non-limiting examples include a personal computer, laptop computer, tablet device, personal digital assistant (PDA), mobile telephone, smart phone, bank machine, an access device for allowing access to a building or room, and an electronic controller for controlling systems or equipment.

The computing device 600 comprises the graphical computer readable media 310, a display 620, and a processor 630. The display 620 is used to display the modified base image and the modified overlay image. In some embodiments, a user interface is part of the display. The processor 630 for executing the instructions. In some embodiments, the computing device 600 also comprises the first memory and the second memory. The computing device 600, in some embodiments also comprises a flash memory on which the authentication module is located.

In some embodiments, dedicated controls are provided on the computing device 600 for moving the representations of the base image or the overlay image or both.

It is to be understood that the embodiments described herein are not limited to one base image and one overlay image. Multiple layers of images are possible. Furthermore, multiple reference points on each layer are also possible.

Figure 7A:
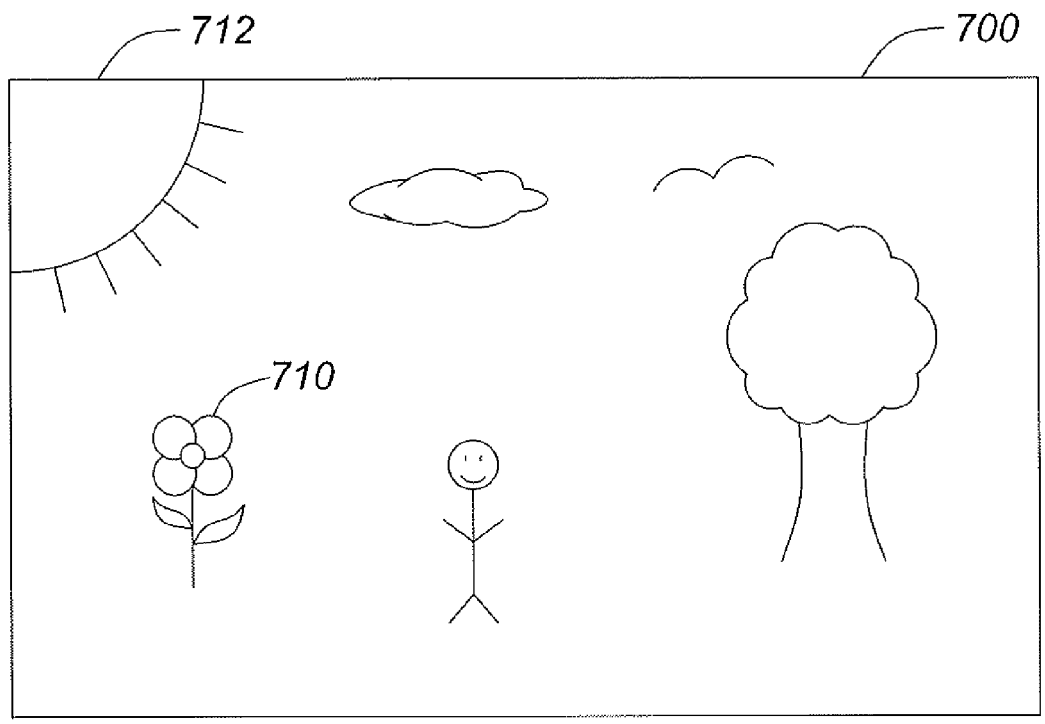
FIGS. 7a to 7e are screen shots illustrating one example embodiment of the present disclosure.
Figure 7B:
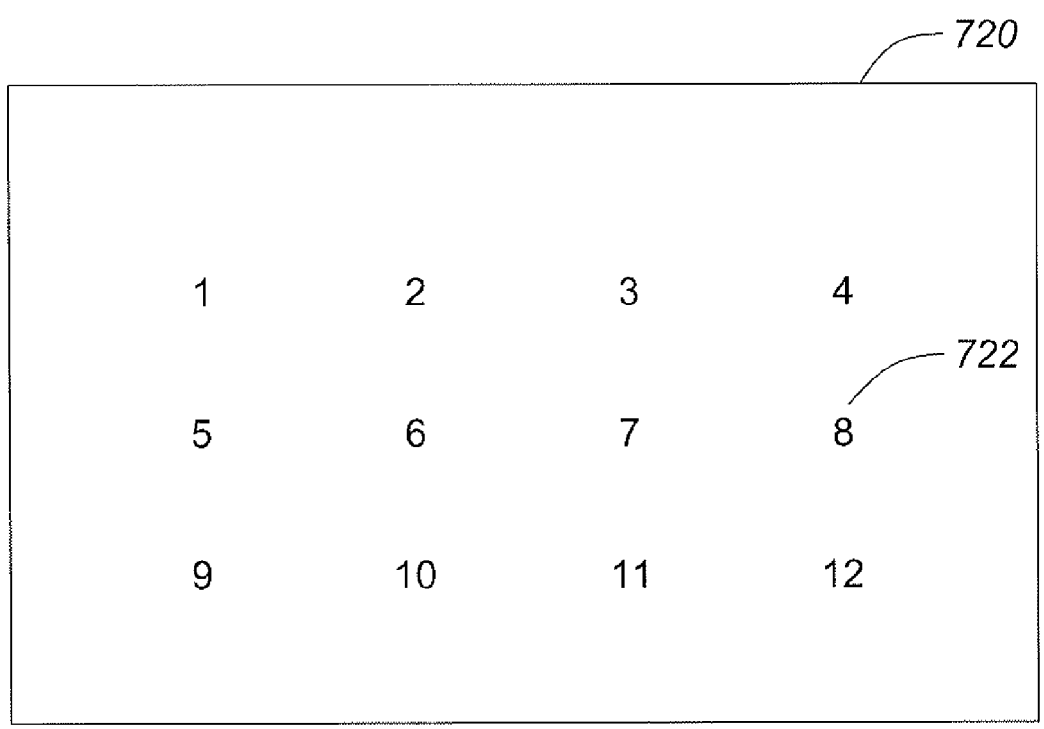
Figure 7C:
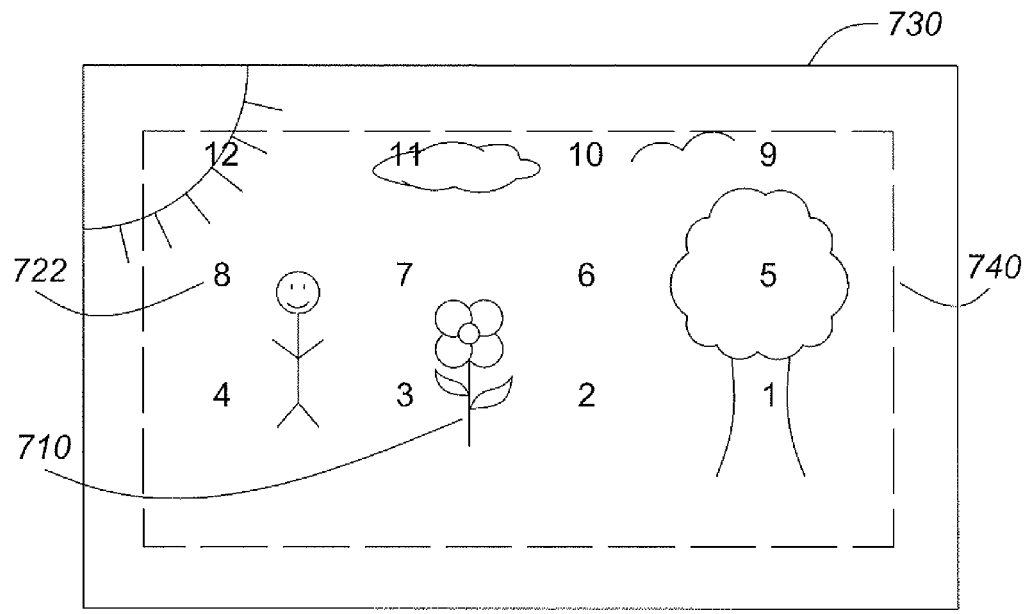
Figure 7D:
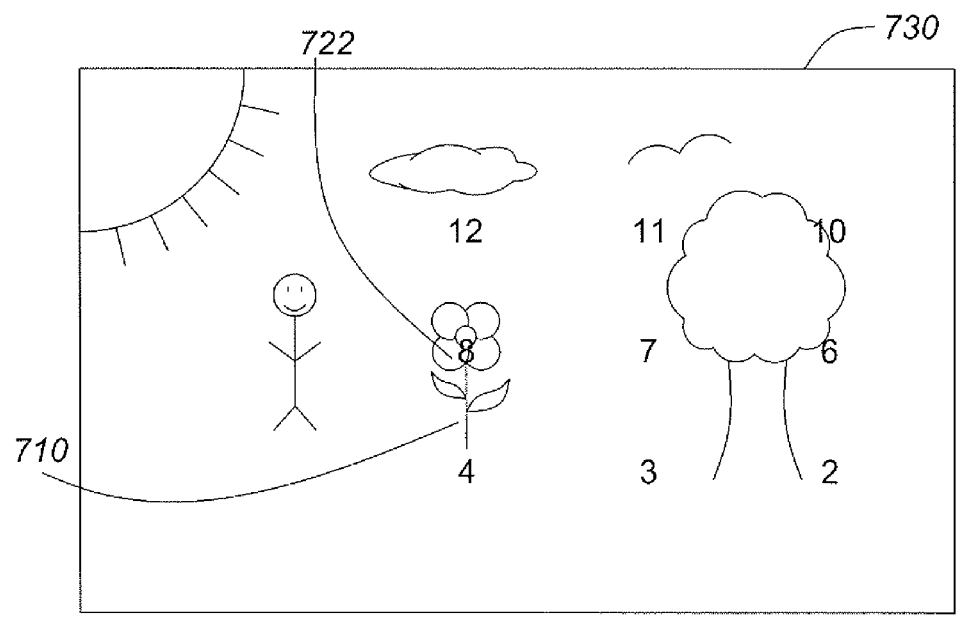
Figure 7E:
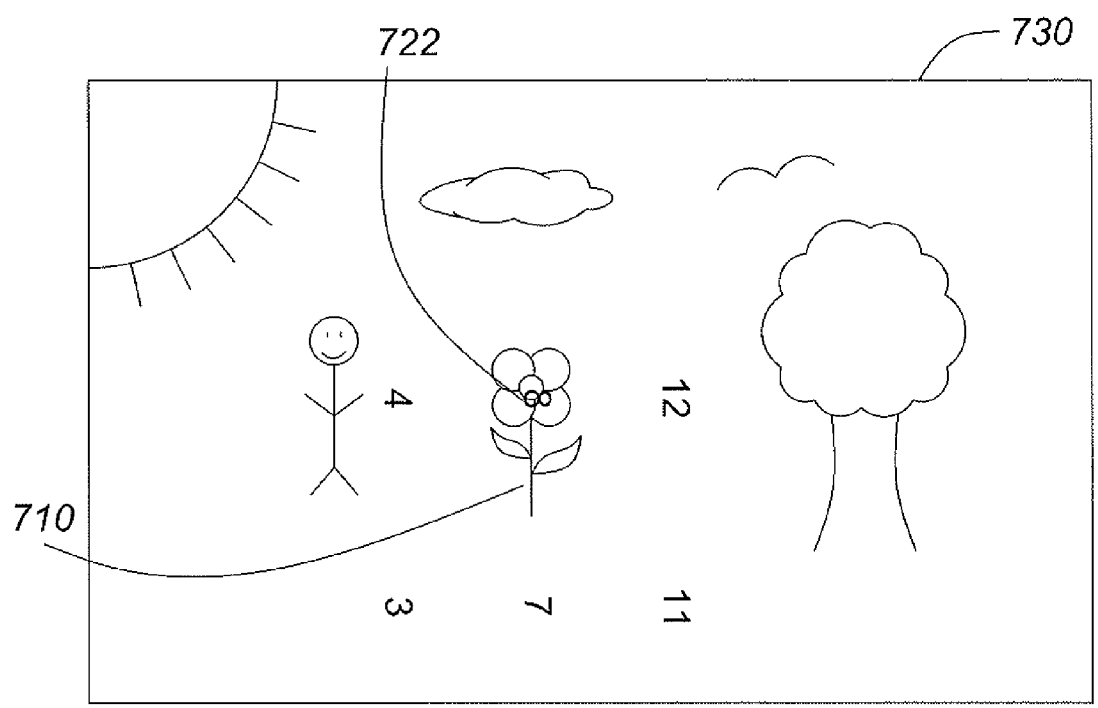

Referring now to the screens shots of FIGS. 7a to 7e, a specific implementation of a proposed method will be described. FIG. 7a shows a base image 700, including a number of objects that can be selected as a reference point: a tree, a flower, a person, a bird, a sun, and a cloud. In this example, the user has selected the flower 710 as the base image reference point. In FIG. 7b, an overlay image 720 which is a grid of numbers from 1 to 12 is shown. In this case, the user has selected number 8 as the overlay image reference point 722. In other embodiments, the grid need not be presented to the user to do the selection. A dialogue box can be presented asking the user to select a number between, for example, 1 and 12. In this embodiment, the user has also selected a 90° clockwise rotation of the overlay image as the pre-selected rotation. Referring to FIG. 7c, to start the authentication of the user, a modified base image 730 is presented overlaid with a modified overlay image 740. In modified base image 730, the position of the flower 710 has been altered. In some embodiments, the position of the base image reference point 710 varies with each authentication attempt. In modified overlay image 740, the order of the numbers in the grid has been altered, so that the overlay reference point 722 is in a different position. In some embodiments, the modified base image is the same in each implementation. In some embodiments, the modified overlay image is the same in each implementation. It also is to be understood that in some embodiments, the order of the numbers in the grid remains the same and that the position of the overlay image reference point 722 may remain the same while the position of the base image reference point 710 varies. In some embodiments, the numbers can appear more than once in the modified overlay image. Referring to FIG. 7d, the user has moved the modified overlay image 740 so that the overlay image reference point 722 is aligned with the base image reference point 710. In FIG. 7e, the user has successfully completed the authentication by rotating the overlay image 90° clockwise after aligning the reference points. As mentioned above, other embodiments are possible. For example, the change in orientation can take place at the start of the authentication procedure. Or there can be a sequence of alignments and changes in orientation required. The change in orientation in some embodiments can be a 3-dimensional change in orientation in some embodiments.

While the present disclosure is sometimes described in terms of methods, a person of ordinary skill in the art will understand that the present disclosure is also directed to various apparatus including components for performing at least some of the aspects and features of the described methods, be it by way of hardware components, software or any combination of the two, or in any other manner. Moreover, an article of manufacture for use with the apparatus, such as a pre-recorded storage device or other similar computer readable medium including program instructions recorded thereon may direct an apparatus to facilitate the practice of the described methods. It is understood that such apparatus, and articles of manufacture also come within the scope of the present disclosure.

The various embodiments presented above are merely examples and are in no way meant to limit the scope of this disclosure. Variations of the innovations described herein will be apparent to persons of ordinary skill in the art, such variations being within the intended scope of the present application. In particular, features from one or more of the above-described embodiments may be selected to generate alternative embodiments comprised of a sub-combination of features which may not be explicitly described above. In addition, features from one or more of the above-described embodiments may be selected and combined to generate alternative embodiments comprised of a combination of features which may not be explicitly described above. Features suitable for such combinations and sub-combinations would be readily apparent to persons skilled in the art upon review of the present application as a whole. The subject matter described herein and in the recited claims intends to cover and embrace all suitable changes in technology.

The invention claimed is:

1. One or more non-transitory computer readable media having computer readable instructions stored thereon for authenticating a user of a computing device, the computing device having a memory storing a base image and an overlay image, the base image having a particular base image reference point, and the overlay image having a particular overlay image reference point, the instructions comprising:

generating a modified base image;

generating a modified overlay image;

displaying, on a display, the modified base image overlaid by the modified overlay image;

receiving an input for moving one of the modified base image and the modified overlay image;

moving the one of the modified base image and the modified overlay image in response to the input;

receiving a further input to change an orientation of the modified base image or the modified overlay image; and in response to alignment of the base image reference point on the modified base image with the overlay image reference point on the modified overlay image at a point on the display and the orientation of the modified base image or the modified overlay image matching a particular orientation criterion, indicating positive authentication.

2. The one or more non-transitory computer readable media of claim 1, wherein the further input is received from a touchscreen display.

3. The one or more non-transitory computer readable media of claim 1, wherein the further input is received from a multi-touch screen.

4. The one or more non-transitory computer readable media of claim 1, wherein the further input is received from a keyboard.

5. The one or more non-transitory computer readable media of claim 1, wherein the change in orientation happens prior to the moving.

6. The one or more non-transitory computer readable media of claim 1, wherein the change in orientation happens after the alignment.

7. The one or more non-transitory computer readable media of claim 1, wherein the moving comprises moving the modified overlay image and the method further comprising removing the modified base image from the display in response to receiving the input.

8. The one or more non-transitory computer readable media of claim 1, wherein in the further input is to change the orientation of the modified overlay image and the modified base image concurrently.

9. The one or more non-transitory computer readable media of claim 3, wherein the further input comprises two or more touches on the multi-touch screen.

10. A method of authenticating a user of a computing device, the computing device having a memory storing a base image and an overlay image, the base image having a particular base image reference point, and the overlay image having a particular overlay image reference point, the method comprising:
   generating a modified base image;
   generating a modified overlay image;
   displaying, on a display, the modified base image overlaid by the modified overlay image;
   receiving an input for moving one of the modified base image and the modified overlay image;
   moving the one of the modified base image and the modified overlay image in response to the input;
   receiving a further input to change an orientation of the modified base image or the modified overlay image; and
   in response to alignment of the base image reference point on the modified base image with the overlay image reference point on the modified overlay image at a point on the display and the orientation of the modified base image and or the modified overlay image matching a particular orientation criterion, indicating positive authentication.

11. The method of claim 10, wherein the further input is received from a touchscreen display.

12. The method of claim 10, wherein the further input is received from a multi-touch screen.

13. The method of claim 12, wherein the further input comprises two or more touches on the multi-touch screen.

14. The method of claim 10, wherein the change in orientation happens prior to the moving.

15. The method of claim 10, wherein the change in orientation happens after the alignment.

16. A computing device comprising:
   a processor;
   a display; and
   one or more computer readable media having computer readable instructions stored thereon that when executed by the processor implement a method of authenticating a user of the computing device, the computing device having a memory storing a base image and an overlay image, the base image having a particular base image reference point, and the overlay image having a particular overlay image reference point, the method including generating a modified base image; generating a modified overlay image; displaying, on the display, the modified base image overlaid by the modified overlay image; receiving an input for moving one of the modified base image and the modified overlay image; moving the one of the modified base image and the modified overlay image in response to the input; assigning a security level requirement for authenticating the user; receiving a further input to change an orientation of the modified base image or the modified overlay image; and in response to alignment of the base image reference point on the modified base image with the overlay image reference point on the modified overlay image at a point on the display and the orientation of the modified base image or the modified overlay image matching a particular orientation criterion, indicating positive authentication.

17. The computing device of claim 16, further comprising the memory.

18. The computing device of claim 16, wherein the display comprises a touch screen and the input is received via the touch screen.

19. The computing device of claim 16, comprising a mobile electronic device.

20. The computing device of claim 16, wherein the display comprises a multi-touch screen and the input is received via the multi-touch screen.

21. The computing device of claim 20, wherein the input comprises two or more touches.

* * * * *